United States Patent [19]

Iwamoto et al.

[11] Patent Number: 5,715,462
[45] Date of Patent: Feb. 3, 1998

[54] UPDATING AND RESTORATION METHOD OF SYSTEM FILE

[75] Inventors: Hiroki Iwamoto, Kawasaki; Kenichi Abe, Kashiwa; Tomiya Nakano, Ushiku, all of Japan

[73] Assignee: NTT Data Communications Systems Corporation, Tokyo, Japan

[21] Appl. No.: 553,617

[22] PCT Filed: Feb. 27, 1995

[86] PCT No.: PCT/JP95/00300

§ 371 Date: Jan. 18, 1996

§ 102(e) Date: Jan. 18, 1996

[87] PCT Pub. No.: WO95/27941

PCT Pub. Date: Oct. 19, 1995

[30] Foreign Application Priority Data

Apr. 12, 1994 [JP] Japan ................... 6-073608

[51] Int. Cl.$^6$ ........................................... G06F 17/30
[52] U.S. Cl. ........................................ 395/712; 395/616
[58] Field of Search ........................... 395/616, 712, 395/703, 685

[56] References Cited

U.S. PATENT DOCUMENTS

| | | | |
|---|---|---|---|
| 4,759,145 | 7/1988 | Goss et al. ........................... | 395/651 |
| 4,862,349 | 8/1989 | Foreman et al. ..................... | 395/682 |
| 5,274,808 | 12/1993 | Miyao et al. ........................ | 395/712 |
| 5,359,730 | 10/1994 | Marron .............................. | 395/712 |
| 5,381,545 | 1/1995 | Baker et al. ..................... | 395/182.17 |
| 5,410,667 | 4/1995 | Belsan et al. ........................ | 395/441 |
| 5,421,017 | 5/1995 | Scholz et al. ....................... | 395/712 |
| 5,430,866 | 7/1995 | Lawrence et al. ................. | 395/182.18 |
| 5,469,573 | 11/1995 | McGill, III et al. ................. | 395/712 |
| 5,555,418 | 9/1996 | Nilsson et al. ....................... | 395/685 |
| 5,572,709 | 11/1996 | Fowler et al. ....................... | 395/500 |

*Primary Examiner*—Paul R. Lintz
*Attorney, Agent, or Firm*—Bachman & LaPointe, P.C.

[57] ABSTRACT

Operating Systems (OS's) of the same form are stored in first and second memory areas. The executing Operating System in the first memory area is terminated and the Operating System in the second area is initiated. After system files stored in the first area are released from access lock, they are replaced by substitute files provided in advance by using a file replacing function of the second Operating system. When such a file replacement fails for some reason, the original operating system files are immediately restored by using a backup file. By this invention, the updating of files previously forbidden by the Operating System in the first memory area to be accessed as well as the restoration of files at the time of update failure can be achieved by software.

5 Claims, 3 Drawing Sheets

UPDATING AND RESTORATION METHOD OF SYSTEM FILE

TECHNICAL FIELD

The present invention relates to a method of updating and restoring system files in a computer, and more specifically, to a method of achieving, by software, updating of system files which are forbidden by an operating system (hereinafter referred to as OS) in operation to be accessed and restoration thereof at the time of update failure.

BACKGROUND ART

Among system files used by an OS, for example, OS/2, WINDOWS or NT, of a computer, if a particular file is rewritten by some mistake, it is possible that a system controlled by that OS docs not function normally. In order to avoid an occurrence of such an error, in general, the OS, during operation, access=locks the files which may raise a problem when rewritten, so as to refuse inadvertent access, such as reading/writing, to the files from another OS, an application program (hereinafter referred to as AP) or the like.

On the other hand, in the system using the computer, necessity for updating system files frequently occurs for extending or improving a processing function. Such updating, for example, in the system having a plurality of terminal equipments connected to a host computer via a communication network, is required to be performed at once at the same timing for ensuring uniformity of operations of the respective terminal equipments. For dealing with this, it is preferable that new system files are transferred at once to the respective terminal equipments from the host computer so as to update the current system files, respectively, using AP's installed in advance in the respective terminal equipments. However, even if the new system files are transferred from the host computer, the system files which are access-locked as described above can not be accessed during the operation of the corresponding OS so that the updating thereof is rendered impossible.

Therefore, conventionally, when updating a system file which is access=locked by the OS, for example, a new system file from the host computer is stored in a hard disk (hereinafter referred to as HDD) of each terminal equipment under a different file name and an OS in operation is once stopped. Then, at an appropriate timing, an operator starts up the same system as that OS using a maintenance flexible disk (hereinafter referred to as FD) so as to enable an access to the foregoing locked system file, and thereafter, processes of renaming the new system file stored in the HDD and the like are performed so as to update the foregoing system file.

In case of a stand-alone system, since an operator managing the system is normally always present, the foregoing series of operations can be easily performed. However, in case of the terminal equipment connected to the host computer via the communication network, although a key operator is present, it is possible that there is no one who manages the system. In such case, it is necessary to send operators having managing ability of the system to places where the terminal equipments are installed every time the updating is performed.

Further, when a large number of the terminal equipments are connected to the host computer and the system files of the OS's of these terminal equipments are updated at the same time, operators having managing ability of the system should be present for all the terminal equipments, which raises a problem in view of operation cost.

Further, when the updating falls due to sector abnormality or the like while a plurality of files in the OS are updated in sequence by new files, it is necessary to once stop the updating to quickly restore the old files for the system preservation. However, if the old files are overwritten by storing the new files, it is impossible to restore the old files so as to raise a problem that logical matching between the files can not be achieved.

In view of the foregoing problems and the like, it is an object of the present invention to provide a method which can achieve updating and restoration of a system file which is access-locked by an OS, without a manual operation by an operator.

It is another object of the present invention to provide a method which can achieve updating and restoration of a system file at each of terminal equipments upon an occurrence of instructions of a remote host computer connected thereto via a communication network.

DISCLOSURE OF INVENTION

In order to accomplish the foregoing objects, the present invention provides, in a computer system wherein OS's having file replacing functions are stored (installed, equally applied hereinafter) in a first memory area and a second memory area, and further, a plurality of system files which are access locked by the OS of the first memory area during operation thereof are stored in the first memory area, a method of performing updating and restoration of the plurality of system files by software. This software includes the following steps:

(1) a step of terminating the OS in operation of the first memory area and activating the OS of the second memory area;

(2) a step of replacing the plurality of system files with substitute files prepared in advance by using the file replacing function of the activated OS of the second memory area and preparing backup files of the replaced system files:

(3) a step of determining whether or not the file replacement is finished normally and restoring the backup files in the first memory area when not finished normally;

(4) a step of terminating the OS in operation of the second memory area and activating the OS of the first memory area when the file replacement is finished normally or when the restoration of the backup files is finished.

Preferably, the step of restoring the backup files in the first memory area replaces all the system files whose file replacement is finished up to then with the corresponding backup files. The substitute files prepared in advance are, for example, system files transferred from a host computer connected via a communication network. Further, the first memory area and the second memory area are areas formed by dividing the same disk apparatus with a partition.

In the system file updating and restoration method of the present invention, for example, the OS's in the same form are stored in the first memory area and the second memory area formed by dividing one disk apparatus with a partition. When the system is started up by the OS of the first memory area and the system files under the control thereof, since these system files are access-locked by the OS, the file updating can not be performed as it stands.

Accordingly, first, the OS in operation of the first memory area is terminated and the OS in the second memory area is activated therefor. By this, since the system files stored in the first memory area are released from access lock, access by the other OS, the AP or the like becomes possible.

Next, the file replacing function of the activated OS of the second memory area is called so as to replace the plurality of system files in the first memory area with the substitute files prepared in advance. That is, the file contents are updated. Further, the backup files of the replaced system files are prepared. Thereafter, it is determined whether or not the file replacement is finished normally, if not finished normally, the foregoing backup files are restored in the first memory area. That is, the state prior to the replacement (prior to updating) is returned. If the file replacement is finished normally or if the restoration of the backup files is finished, the OS in operation of the second memory area is terminated and the OS of the first memory area is activated. By this, the automatic updating process and the automatic restoring process at the time of update failure, of the system files which are access-locked are performed.

The foregoing substitute files, that is, the system files, may be transferred from the remote host computer connected via the communication network, and may also be held so as to be replaceable at the preset update time. In this case, the foregoing software executes the file replacement by comparing the current time and the foregoing update time. This way, remote processing of the system file updating and restoration is made possible.

BEST MODE FOR CARRYING OUT THE INVENTION

Hereinbelow, an embodiment of the present invention will be described in detail with reference to the drawings.

Figure 1:
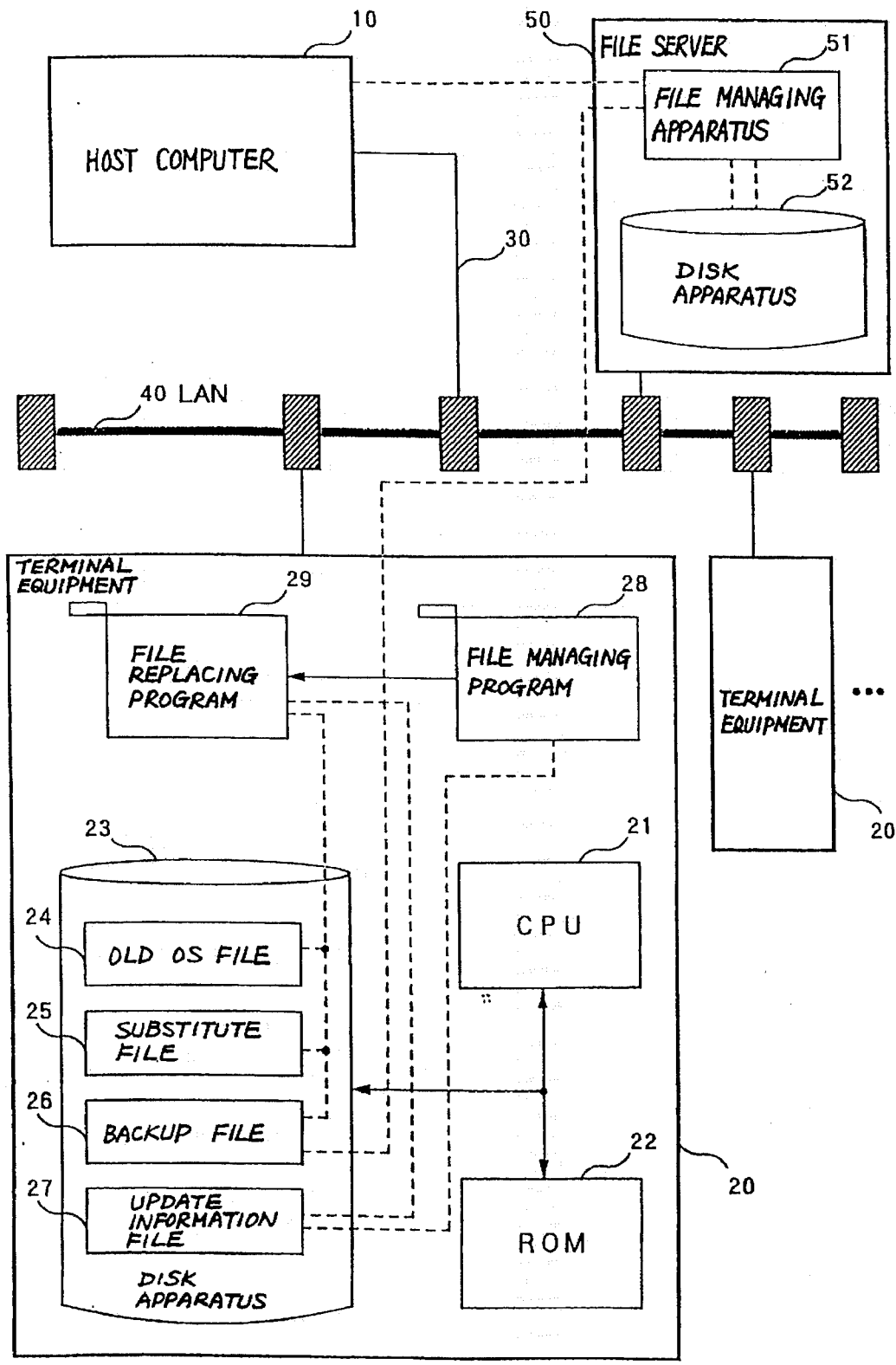
FIG. 1 is a schematic structural diagram of a computer system according to an embodiment of the present invention.

FIG. 1 is a structural block diagram of a computer system according to the embodiment of the present invention. In the figure, 10 represents a host computer, 20 a terminal equipment, 30 a communication network in the form of telephone lines, private lines, ISDN or the like, 40 a LAN (local area network) and 50 a filer server.

The host computer 10 is, for example, a data base machine and controls an operation of each of components of the present system, and has a function of performing transmission and reception of files and data relative to each terminal equipment 20 and the file server 50.

Each of the terminal equipments 20 has the same structure and includes a CPU (central processing unit) 21 for controlling operations of components of the terminal equipment, a ROM (read only memory) 22 storing software necessary for start=up and a disk apparatus 23 so as to constitute a computer which can execute various AP's under the control of an OS, such as OS/2. WINDOWS OR NT. Each terminal equipment 20 also has a function of performing transmission and reception of files and data relative to the host computer 10 and the file server 50.

The disk apparatus 23 is divided into at least two areas by a partition to logically form a plurality of memory devices (areas). OS's in the same form are stored in a first memory area PT1 and a second memory area PT2. Further, in the first memory area PT1, a plurality of OS files (for convenience, referred to as old OS files in this embodiment) 24 which are access-locked by the OS in operation of the first memory area, are stored. In the second memory area, OS files (for convenience, hereinafter referred to as substitute files in this embodiment) 25 to be substituted for are stored.

Figure 2:
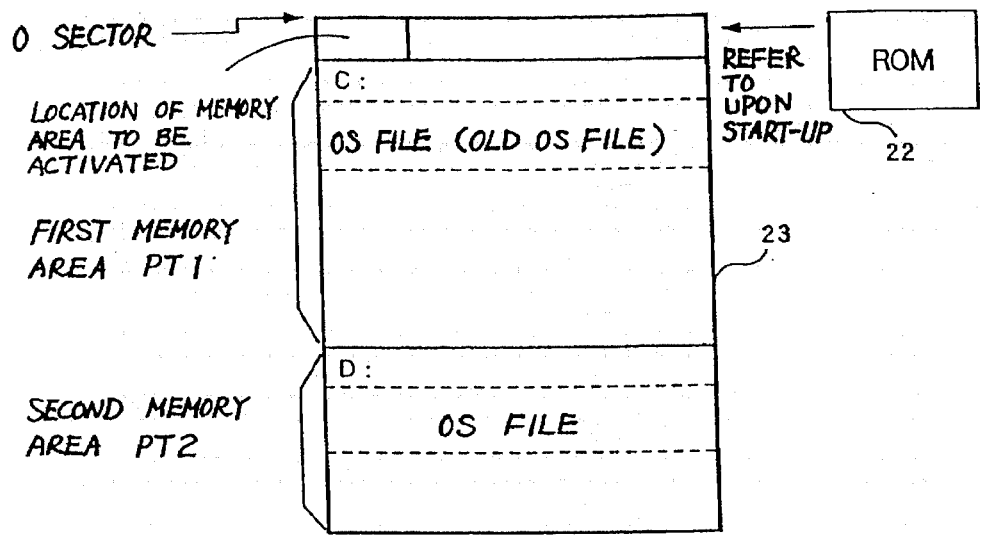
FIG. 2 is a diagram showing a structure of a memory area of a disk apparatus in a terminal equipment in the structure of FIG. 1 and an example of a file arrangement therein.

FIG. 2 shows an arrangement example of the foregoing area-divided disk apparatus 23. In FIG. 2, instruction data as to which memory area the software of the ROM 31 should read upon start-up is written in a 0 sector. After start-up, the OS in the memory area designated by the instruction data is set operative so as to access-lock the OS files within the area.

In the other memory area of the disk apparatus 2 are stored a backup file 26 and an update information file 27.

The backup file 26 is a file for temporarily storing the old OS files 24 upon later-described file replacement. This backup file 26 may be stored in the foregoing first or second memory area PT1, PT2. In this case, however, it is necessary, for example, to change a file name.

The update information file 27 is a file for confirming a file update state upon activation of the terminal equipment 20 and the like and setting various data to be used upon the later described file replacement. The update information file 27 is prepared and referred to by an AP calling the file replacing function, such as a shown file managing program 28, and further referred to upon occasion when the file replacing function called upon the replacing process, that is, a program replacing program 29, is executed. Although its file structure and setting contents are arbitrary, output designation of a file replacing result at the time of updating or restoration, designation of a post-process after the file replacement, that is, restart/power-off, designation of restoration/non-restoration at the time of file replacement abnormality, designation of substitute file names, result data indicative of normal, abnormal, during replacement and during restoration and the like, are stored in this embodiment.

The file server 50 keeps various files in the terminal equipments 20 connected thereto via the LAN 40 and performs file management for executing a revising process for these files and the like. The file server 50 is provided with a file managing apparatus 51 and a disk apparatus 52 storing a plurality of files, data necessary for the file managing process executed by the file managing apparatus 51 and the like.

The updating and restoration processes of the OS files in the computer system having the foregoing structure start first with transfer of new OS files to be substituted for from the host computer 10 to the disk apparatus 52 of the file server 50. The file managing apparatus 51 of the filer server 50 copies the transferred OS files from the disk apparatus 52 and sends them out to the respective terminal equipments 20 connected to the LAN 40. These new OS files include time data representing the scheduled update time. The terminal equipment 20 obtains these OS files and stores them in the disk apparatus 23 for using as the substitute files 25.

Figure 3:
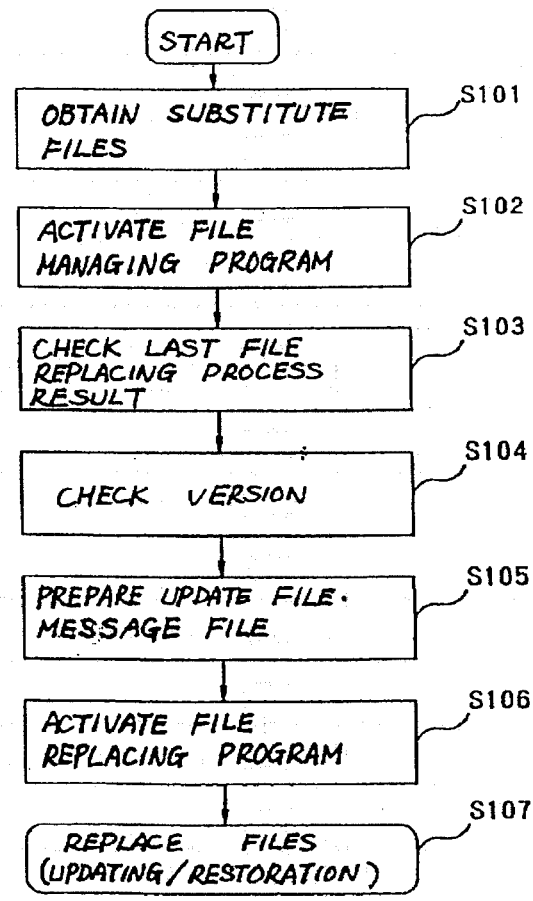
FIG. 3 is a flowchart showing a procedure for actually performing file updating and restoring processes at the terminal equipment in the structure of FIG. 1.

FIG. 3 is a flowchart showing a procedure for actually performing the file updating and restored processes at each terminal equipment 20.

Referring to FIG. 3, after obtaining the foregoing substitute OS files (step (hereinafter, S) 101), each terminal equipment 20 activates the file managing program 28 may be activated upon start-up of the system or managing program 28 may be activated upon start-up of the system or immediately after obtaining the foregoing OS files.

The activated file managing program 28 executes checking of a result of the last file replacing process (S103). This process is performed by, for example, confirming the corresponding result data recorded in the update information file.

If the check indicates normal, a version of the old OS files 24 is checked to see whether there is mismatching (S104). If there is mismatching, since this indicates necessity for the file replacement, the update information file 27 and a file of message to the operator are prepared (S105). Further, the file replacing program 29 is automatically activated via, for example, an application program interface (API) (not shown) provided as a function of the OS (S106) so as to perform the file replacement (S107). The execution of the processes S103–S106 is premised that the current time and the foregoing scheduled update time coincide with each other.

Figure 4:
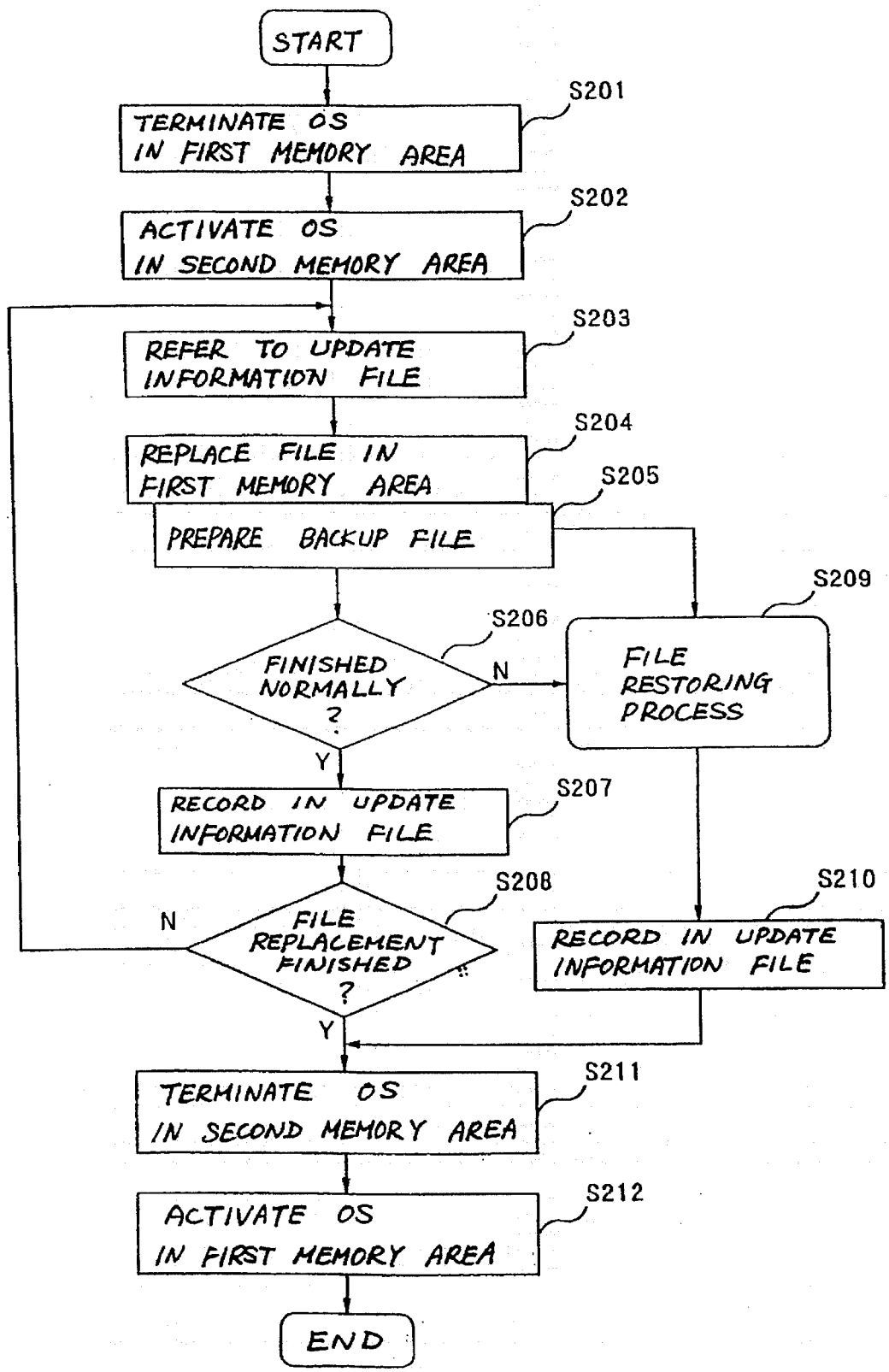
FIG. 4 is a flowchart showing a file replacing procedure of a file replacing program to be used in the present embodiment.

FIG. 4 shows a procedure of the file replacement by the activated file replacing program 29 (the foregoing S107). Hereinbelow, this procedure will be described in detail with reference to FIG. 4.

In the file replacing program 29, the normally operative OS, for example, the OS in the first memory area PT1, which is now in operation, is terminated (S201), and the OS in the second memory area PT2 is activated therefor (S202). By this, the old OS files 24 controlled by the first memory area PT1 up to then are released from access lock so that updating thereof is made possible. Specifically, after activation of the OS in the second memory area PT2, the OS files in the second memory area PT2 are access-locked, while the old OS files 24 stored in the first memory area PT1 and operated up to then can be freely accessed.

Next, the update information file 27 is referred to (S204), and the old OS files 24 stored in the first memory area PT1 are replaced with the substitute files 25, respectively, according to the set file order (S204), and the backup files of the old OS files 24 are prepared in order (S205). Thereafter, it is determined whether or not the file replacement is performed normally (S206). If normal, it is recorded in the update information file 27 to that effect in sequence (S207). If there remains another substitute file 25, the procedure returns to S203.

On the other hand, if abnormal finish is detected at S206, that is, if the replacement falls for some reason, the file restoring process is executed (S209). This file restoring process is a process for replacing all the substitute files 25 in the first memory area PT1 whose file replacement has been finished up to then, with the corresponding backup files (old OS files) prepared at step S205. Since the OS of the first memory area is terminated, the file replacement at this time is also possible. When the file restoration is performed, it is recorded in the update information file S210 to that effect. By this, the non-finish of the file updating can be indicated when the next file replacement is performed.

This way, if the replacing processes are all finished normally or if the file restoring process is finished, the OS in the second memory area PT2 is terminated (S211), and the OS in the first memory area PT1 is again activated so as to return to the normal operation (S212).

As described above, even if access-locked by the OS conventionally, the updating based on the file replacement is made possible in this embodiment and further can be automatically performed by the AP within the terminal equipment 20 by the remote.

The file updating and restoring method in the computer system according to this embodiment has been described based on the particular process sequence. However, the present invention is not limited to the foregoing sequence but can be carried out in various modes.

For example, in this embodiment, the structure has been described wherein the substitute files 26 are transferred to the terminal equipments 20 via the file server 50 from the remote host computer 10 connected via the communication network. On the other hand, the stand-alone system can also be applied similarly.

Further, in this embodiment, the explanation has been made, for convenience, on the premise that the OS of the first memory area and the OS in the second memory area are in the same form. On the other hand, since it is sufficient that an OS which can access a file access-locked by an OS of the first memory area PT1 is stored in the second memory area PT2, both are not necessarily in the same form. Further, in this embodiment, although the example has been described wherein the file replacing function and the API provided by the OS are utilized, it is not necessarily required as such and they can be achieved by the AP.

INDUSTRIAL APPLICABILITY

As described above, in the system file updating and restoring method of the present invention, the OS's, for example, in the same form, are stored in the first and second memory areas, the OS in operation of the first memory area is terminated and the OS of the second memory area is activated therefor, and after the system files stored in the first memory area are released from access lock, these system files are replaced with the substitute files prepared in advance, using the file replacing function of the second OS. Accordingly, the replacement (updating) of the files which are forbidden by the OS to be accessed can be performed by the software.

Further, even when such a file replacement falls for some reason, since the original files can be immediately restored by using the backup files, the reliability of the system can be enhanced. Particularly, since the restoring process is a process for replacing all the system files whose file replacement has been finished up to then with the corresponding backup files, there is provided an effect which facilitates holding of the logical matching between the files in each terminal equipment.

Further, the substitute files are transferred to the plurality of terminal equipments from the remote host computer connected via the communication network, and the file replacement can be performed at the preset update time by executing the foregoing software. Accordingly, the remote processing of the system file updating and restoration is made possible. By this, it becomes unnecessary to send the operators having the system managing ability to the places where the terminal equipments are arranged every time the updating is performed, as required conventionally.

We claim:

1. In a computer system wherein operating systems each having a file replacing function are stored in a first memory area and a second memory area, respectively, and further, a plurality of system files which are access-locked by said operating system of the first memory area during operation thereof are stored in said first memory area, a system file updating and restoration method of performing updating and restoration of said plurality of system files by software characterized in that said software includes:

a step of terminating the operating system in operation of the first memory area and activating the operating system of the second memory area;

a step of replacing the plurality of system files in said first memory area with substitute files prepared in advance by using the file replacing function of the activated operating system of the second memory area and preparing backup files of the replaced system files;

a step of determining whether or not said file replacement is finished normally and restoring said backup files in said first memory area when not finished normally; and a step of terminating the operating system in operation of the second memory area and activating the operating system of the first memory area when said file replacement is finished normally or when the restoration of said backup files is finished.

2. The system file updating and restoration method as set forth in claim 1 characterized in that the step of restoring said backup files in the first memory area is a process for replacing all the system files whose file replacement is finished up to then with the corresponding backup files.

3. The system file updating and restoration method as set forth in claim 1 characterized in that said substitute files prepared in advance are system files transferred from a host computer connected via a communication network.

4. The system file updating and restoration method as set forth in claim 1 characterized in that said first memory area and said second memory area are areas formed by dividing one disk apparatus with a partition.

5. The system file updating and restoration method as set forth in claim 1 characterized in that the operating systems stored in said first memory area and said second memory area are in the same form.

* * * * *